United States Patent [19]

Möller et al.

[11] 4,371,667

[45] Feb. 1, 1983

[54] BAKING LACQUER

[75] Inventors: Dieter Möller, Ascheberg; Ulrich Poth, Münster, both of Fed. Rep. of Germany

[73] Assignee: BASF Farben & Fasern AG, Hamburg, Fed. Rep. of Germany

[21] Appl. No.: 269,531

[22] Filed: Jun. 2, 1981

[30] Foreign Application Priority Data

Jun. 20, 1980 [DE] Fed. Rep. of Germany ....... 3022996

[51] Int. Cl.$^3$ ...................... C08L 37/00; C08L 41/00
[52] U.S. Cl. ..................................... 525/208; 523/437
[58] Field of Search ......................................... 525/208

[56] References Cited

U.S. PATENT DOCUMENTS

| | | | |
|---|---|---|---|
| 3,330,814 | 7/1967 | Vasta | 525/110 |
| 3,888,943 | 6/1975 | Labana | 525/208 |
| 3,914,333 | 10/1975 | Labana | 525/208 |
| 3,959,405 | 5/1976 | Labana | 525/208 |
| 3,976,715 | 8/1976 | Labana | 525/208 |
| 3,976,716 | 8/1976 | Labana | 525/208 |
| 3,976,717 | 8/1976 | Labana | 525/208 |
| 3,976,718 | 8/1976 | Labana | 525/208 |
| 3,976,719 | 8/1976 | Labana | 525/208 |
| 3,998,905 | 12/1976 | Labana | 525/208 |
| 4,006,200 | 2/1977 | Labana | 525/208 |

FOREIGN PATENT DOCUMENTS 753685 2/1967 Canada ............................... 525/208

*Primary Examiner*—Paul Lieberman
*Attorney, Agent, or Firm*—Wells & Wells

[57] ABSTRACT

A baking lacquer based on acrylate polymers in organic solvents, optionally with coloring pigments and/or fillers is disclosed. The layer is characterized by a combination of two acrylate polymers A and B, wherein acrylate polymer A is a copolymer of copolymerizable ethylenically unsaturated compounds possessing free carboxyl groups originating from copolymerized alpha, beta-ethylenically unsaturated carboxylic acids, a proportion of the free carboxyl groups being esterified with a glycerol radical, which also contains other fatty acid radicals attached by ester bonds, so that 0.5–3 moles of free alpha, beta-ethylenically unsaturated carboxylic acid and 0.6 to 2 moles of alpha, beta-ethylenically unsaturated carboxylic acid esterified with the glycerol radical are employed per 1,000 g of acrylate polymer, and wherein acrylate polymer B is a polymer of an alpha, beta-ethylenically unsaturated carboxylic acid and, optionally, other, copolymerizable, ethylenically unsaturated compounds, in which the carboxyl groups are esterified with a radical which contains at least one epoxide group, the number of epoxide groups being so chosen as to give an epoxide equivalent weight of between 120 and 2,000.

6 Claims, No Drawings

BAKING LACQUER

The invention relates to a baking lacquer which is based on acrylic polymers in organic solvents, and which optionally contains pigments, fillers and conventional additives.

Acrylate resins have already been proposed as binders in baking lacquers for refrigerators, washing machines and kitchen machinery (household equipment) and are distinguished by a number of advantageous properties. However, the disadvantage of such baking lacquers is that they have limited resistance to outdoor conditions when used in the automotive sector, and that their corrosion resistance does not conform to all requirements.

Accordingly, it was surprising and unforeseeable that baking lacquers of the initially mentioned type do not exhibit these disadvantages if they are characterized in that a combination of two acrylate polymers A and B is used, wherein acrylate polymer A is a copolymer of copolymerizable ethylenically unsaturated compounds possessing free carboxyl groups originating from copolymerized alpha, beta-ethylenically unsaturated carboxylic acids, a proportion of the free carboxyl groups being esterified with a glycerol radical, which also contains other fatty acid radicals attached by ester bonds, so that 0.5-3 moles of free alpha,beta-ethylenically unsaturated carboxylic acid and 0.6 to 2 moles of alpha,-beta-ethylenically unsaturated carboxylic acid esterified with the glycerol radical are employed per 1,000 g of acrylate polymer, and wherein acrylate polymer B is a polymer of an alpha,beta-ethylenically unsaturated carboxylic acid and, optionally, other, copolymerizable, ethylenically unsaturated compounds, in which the carboxyl groups are esterified with a radical which contains at least one epoxide group, the number of epoxide groups being so chosen as to give an epoxide equivalent weight of between 120 and 2,000.

In a particularly advantageous embodiment, the ratio of the acrylate polymer A to the acrylate polymer B in the baking lacquer is such as to provide 0.5 to 1.5, preferably 0.9 to 1.1, carboxyl groups of the acrylate polymer A per epoxide group of the acrylate polymer B.

The acrylate polymer A in the sense of the present invention is a copolymer of copolymerizable ethylenically unsaturated compounds possessing free carboxyl groups originating from copolymerized alpha,beta-ethylenically unsaturated carboxylic acid, a proportion of the free carboxyl groups being esterified with a glycerol radical, which also contains other fatty acid radicals attached by ester bonds. This esterification is carried out in such a way that 0.5-3 moles of free alpha,-beta-ethylenically unsaturated carboxylic acid and 0.6 to 2 moles of alpha,beta-ethylenically unsaturated carboxylic acid esterified with the glycerol radical are employed per 1,000 g of acrylate polymer.

Particularly suitable alpha,beta-ethylenically unsaturated carboxylic acids are acrylic acid and methacrylic acid, as well as maleic acid, fumaric acid, itaconic acid and mesaconic acid, and the half-esters of maleic acid and fumaric acid with aliphatic alcohols, such as ethyl alcohol, n-propyl alcohol, iso-propyl alcohol, n-butyl alcohol, iso-butyl alcohol, tertiary butyl alcohol and 2-ethylhexyl alcohol. Mixtures of carboxylic acids and-/or half-esters can also be used.

As far as the other copolymerizable ethylenically unsaturated compounds are concerned, suitable compounds are styrene, vinyltoluene, alkyl esters and hydroxyalkyl esters of acrylic acid and methacrylic acid, and also acrylonitrile, methacrylonitrile, acrylamides, methacrylamides, vinyl acetate, maleic acid diesters, vinyl propionate, vinyl stearate, vinylidene chloride, N-vinyl urea, N-vinyl-N'-oxaalkylureas and N-vinyl-pyrrolidone. Mixtures of these compounds can also be used.

The radical, derived from glycerol, which effects the esterification corresponds to the general formula:

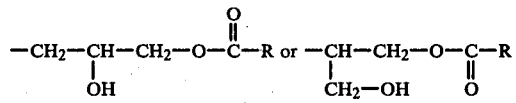

wherein R denotes a saturated and/or unsaturated aliphatic hydrocarbon radical having 1 to 26 C atoms, or a branched chain of the formula:

$R_1$, $R_2$ and $R_3$ can be H or saturated and/or unsaturated aliphatic hydrocarbon radicals having a straight chain of 1 to 12 C atoms.

Such copolymers, and their preparation, are described, for example, in British Patent Specification No. 1,009,217, French Patent Specification No. 1,399,037 and German Patent Specification No. 1,644,822.

The acrylate polymer B in the sense of the present invention is a polymer of an alpha,beta-ethylenically unsaturated carboxylic acid and, optionally, other copolymerizable ethylenically unsaturated compounds, in which the carboxyl groups are completely esterified with a radical which contains at least one epoxide group, the number of epoxide groups being so chosen as to give an epoxide equivalent weight of between 120 and 2,000.

Suitable alpha,beta-ethylenically unsaturated carboxylic acids and other copolymerizable ethylenically unsaturated compounds are, again, those described under acrylate polymer A.

The introduction of the radical containing at least one epoxide group into the carboxyl groups via an ester link is effected by the conventional methods of polymerization technology, advantageously by polymerizing esters of the above-defined alpha,beta-ethylenically unsaturated carboxylic acids with epoxide compounds containing hydroxyl groups.

Examples of particularly advantageously suitable esters of the alpha,beta-ethylenically unsaturated carboxylic acids with epoxide compounds containing hydroxyl groups are glycidyl acrylate and glycidyl methacrylate.

Preferably, an acrylate polymer B is obtained by polymerizing glycidyl acrylate and/or glycidyl methacrylate. Other copolymerizable ethylenically unsaturated compounds can be copolymerized with these monomers. These other copolymerizable ethylenically unsaturated compounds, used as comonomers in the polymerization of glycidyl acrylate and/or glycidyl methacrylate, will be chosen, where appropriate, in accordance with the desired properties of the polymer B.

In addition to the acrylate polymers A and B and organic solvents, the baking lacquers can contain conventional amounts of the conventional additives for baking lacquers of this type, such as agents for improving leveling and improving gloss, pigments, fillers, soluble dyestuffs, light stabilizers and hardening catalysts.

The baking lacquers according to the invention are suitable for the production of high-quality baked finishes, especially on primed or unprimed metals or other materials used in the automotive industry, especially for bodywork. They are distinguished by complete hardening, accompanied by crosslinking of the films, when they are baked at temperatures of 130° C. to 200° C. for a period of from 40 minutes down to 10 minutes.

The baking time depends on the baking temperature and can be reduced even further if higher baking temperatures than 200° C. are used. This is particularly the case with infrared drying.

Finishes obtained with these baking lacquers exhibit not only excellent weathering resistance but outstanding protection against corrosion, and good resistance to chemicals.

Because of the good wetting properties of the copolymers, pigments can easily be incorporated into the baking lacquers. They have excellent shelf life.

The parts and percentages mentioned in the Examples are by weight.

EXAMPLES

EXAMPLE 1

Preparation of an acrylate polymer A 900 parts of xylene are heated to the boil under reflux in a reaction vessel, whilst being stirred and whilst an inert gas (carbon dioxide or nitrogen) is passed in. A mixture of 480 parts of styrene, 134 parts of methacrylic acid, 298 parts of butyl acrylate and 30 parts of dibenzoyl peroxide (75% of peroxide, 25% of water) is run uniformly, in the course of 3 hours, into the boiling xylene. Thereafter a mixture of 288 parts of epoxide ester, 50 parts of xylene and 12 parts of dibenzoyl peroxide (75% strength) is added and boiling of the mixture is continued until the acid number remains constant. After filtration, a clear solution of a copolymer condensate is thus obtained, which after dilution to a solids content of 50% with n-butanol has an acid number of 31, based on the solid resin.

The "epoxide ester" used is a commercial glycidyl ester mixture (Cardura E from Deutsche Shell AG), of which the acid radical predominantly consists of a tertiary carboxylic acid of the formula:

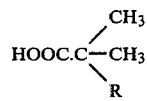

in which R represents a hydrocarbon radical having a straight aliphatic chain possessing between 1 and 11 C atoms. The epoxide equivalent weight of the glycidyl ester mixture is 245.

EXAMPLE 2

(Preparation of an acrylate polymer A)

Example 1 is repeated, with the difference that 177 parts of methacrylic acid and 255 parts of butyl acrylate are employed. The resin solution obtained, after dilution to a solids content of 50% with n-butanol, has an acid number of 52, based on the solid resin.

EXAMPLE 3

(Preparation of an acrylate polymer A)

A. 1,850 parts of epoxide ester are heated to 120° C. in a 4 liter three-necked flask, whilst being stirred and whilst nitrogen is passed in. 650 parts of methacrylic acid are run in over the course of 3 hours, whilst the temperature is kept constant at 120° C. After completion of the reaction, the mixture is cooled rapidly. An adduct having an acid number of less than 10 is obtained.

B. 900 parts of xylene are heated to the boil, under reflux, in a stirred vessel, and under inert gas. A mixture of 480 parts of styrene, 389 parts of the adduct described under A, 235 parts of methyl methacrylate, 101 parts of methacrylic acid and 30 parts of dibenzoyl peroxide (75% strength) is then dripped from a dropping funnel into the boiling xylene, over the course of 3 hours. Boiling of the reaction mixture is then continued until a solids content of 54 to 55% has been reached. The mixture is then cooled, filtered and brought to a solids content of 50% with n-butanol.

The acid number of the solid resin is 61.5.

EXAMPLE 4

(Preparation of an acrylate polymer B)

800 g of an aromatics' mixture (boiling range 156°–172° C.) are weighed out into a four-necked flask which is equipped with a stirrer, thermometer, protective gas inlet tube, reflux condenser and metering vessel having electrical resistance heating, and are heated to 140° C. A previously prepared mixture of 180 g of styrene, 240 g of glycidyl methacrylate, 360 g of n-butyl methacrylate, 420 g of n-butyl acetate and 14.5 g of di-tert.-butyl peroxide is then introduced uniformly, in the course of 3 hours, from the metering vessel, the temperature being kept at 140° C. After a further 30 minutes at 140° C., 3.6 g of di-tert.-butyl peroxide, dissolved in 4 g of the above mixture of aromatics, are added and polymerization is continued for a further 1.5 hours. An acrylate resin solution is obtained which has a solids content of 60% (measured after drying in a circulating air oven for 15 minutes at 180° C.), an epoxide equivalent weight of 709, based on solid resin, and a viscosity of 510 mPa.s, measured at 25° C. in an ICI viscometer.

EXAMPLE 5

(Preparation of an acrylate polymer B)

Example 4 is repeated, with the difference that in place of 240 g of glycidyl methacrylate, 324 g are used, and instead of 420 g of n-butyl acrylate, 336 g are used. The acrylate resin solution obtained has a solids content of 60%, an epoxide equivalent weight of 526, based on solid resin, and a viscosity of 740 mPa.s, measured at 25° C. in a plate-and-cone viscometer.

EXAMPLE 6

30.0 parts of the 60% strength solution of the acrylate polymer B obtained according to Example 5, 5.5 parts of glycol mono-n-butyl ether, 0.3 part of a thickener (a paste of 10 parts of Bentone, a montmorillonite containing quaternary organic ammonium bases, in 90 parts of xylene), 0.2 part of finely divided silica aerogel and 26.0 parts of titanium dioxide pigment (rutile type) are milled on a ball mill or sand mill or some other dispersing equipment, customary in the lacquer industry, to give a particle fineness of <5 μm. Thereafter, 35.0 parts of the 50% strength solution of the acrylate polymer A obtained according to Example 1, 1.5 parts of a zinc octoate solution in xylene (42% solids content) and 1.5 parts of a 5% strength solution of silicone oil in xylene are added to this milled mixture.

To test the shelf life, the baking lacquer obtained is stored for 8 weeks at 50° C. The initial consistency, namely a flow time of 50 sec from a DIN 53,211 cup with 4 mm nozzle diameter, shows only an insignificant change.

To apply the baking lacquer obtained, it is diluted with 8 parts of xylene and 2 parts of butylglycol until the flow time from a DIN 53,211 cup with a nozzle of 4 mm diameter is about 30 seconds. A bodywork panel, containing a baking filler, based on alkydmelamine resin, which has been hardened by baking, is then coated with the lacquer by means of a spray gun (3 atmospheres gauge pressure).

The film is baked for 30 minutes at 135° C. in a circulating air oven. The dry thickness of the coating is 40–50 μm. The coating is very glossy.

The KöÖË üö Iäöü Ö ü Iä 150 sec. The Gardner gloss, using a 20° measuring head, is more than 80%.

The sample was weathered for 1,200 hours in a Xenotest 1200 apparatus. The decrease in gloss was measured. The Gardner gloss (20° measuring head) was:
77% after 200 hours,
77% after 400 hours,
73% after 800 hours and
58% after 1,200 hours.
Over the same time, the gloss of a conventional alkyd resin/melamine resin baking lacquer drops from an initial value of 70% to 7%.

The coating is furthermore resistant to hydrochloric acid and sulfuric acid, as examined after 96 hours' exposure to 10% strength hydrochloric acid and 10% strength sulfuric acid.

EXAMPLE 7

Example 6 is repeated, with the difference that instead of the acrylate polymer B prepared according to Example 5, the acrylate polymer B obtained according to Example 4 is employed, and in place of the acrylate polymer A prepared according to Example 1, the acrylate polymer A obtained according to Example 2 is employed. The results obtained correspond to those of Example 6.

We claim:

1. In a liquid coating composition having as the essential organic film-forming component thereof, a heat-curable mixture of:
A. an organic solvent-soluble acidic copolymer of a plurality of polymerizable alpha,beta-monoethylenically unsaturated monomers consisting essentially of
   (1) at least one member selected from the group consisting of alpha,beta-monoethylenically unsaturated hydrocarbons;
   (2) alkanol esters of alpha,beta-monoethylenically unsaturated monocarboxylic acids; and
   (3) an alpha,beta-monoethylenically unsaturated carboxylic acid having from one to two —COOH moieties per molecule in a proportion sufficient to provide said acidic polymer with a carboxylic acid number in the range of 10 to 150; and
B. an organic solvent-soluble epoxy functional copolymer of a plurality of polymerizable alpha,beta-monoethylenically unsaturated monomers;
the improvement comprising:
   (1) said acidic copolymer (A), wherein 1000 g thereof contain 0.5 to 3 moles of alpha,beta-monoethylenically unsaturated carboxylic acid and 0.6 to 2 moles of alpha,beta-monoethylenically unsaturated carboxylic acid monomer units esterified with a structure selected from the group consisting of:

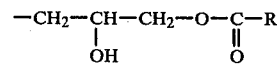

or

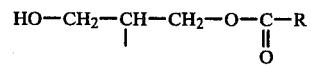

wherein R is a saturated or unsaturated aliphatic hydrocarbon radical having 1 to 26 carbon atoms, or a branched chain of the formula

where $R_1$, $R_2$ and $R_3$ are an H atom or saturated or unsaturated aliphatic hydrocarbon radicals having a straight chain of 1 to 12 carbon atoms; and
   (2) said epoxy functional polymer (B) is a copolymer of at least one member selected from the group consisting of alpha,beta-monoethylenically unsaturated hydrocarbons, alkanol esters of alpha,beta-monoethylenically unsaturated monocarboxylic acids, and glycidyl esters of alpha,beta-monoethylenically unsaturated monocarboxylic acids in sufficient proportion to provide said epoxy copolymer with an epoxy equivalent weight of from 120 to 2000; and
   (3) the relative proportions of said acidic copolymer (A) and said epoxy copolymer (B) are 0.5 to 1.5 carboxylic groups of the copolymer (A) per epoxy group of the copolymer (B); and
   (4) said heat-curable mixture is in solution in a volatile liquid comprising an organic solvent therefor.

2. The coating composition of claim 1, wherein 0.5 to 1.5 carboxyl groups of copolymer (A) are provided per epoxide group of copolymer (B).

3. The coating composition of claim 1, wherein 0.9 to 1.1 carboxyl groups of copolymer (A) are provided per epoxide group of copolymer (B).

4. In a method for applying a liquid coating composition to a substrate and hardening the coating formed by baking at elevated temperatures, said liquid coating composition having as the essential organic film-forming compound thereof, a heat-curable mixture of:
A. an organic solvent-soluble acidic copolymer of a plurality of polymerizable alpha,beta-monoethylenically unsaturated monomers consisting essentially of
   (1) at least one member selected from the group consisting of alpha,beta-monoethylenically unsaturated hydrocarbons;
   (2) alkanol esters of alpha,beta-monoethylenically unsaturated monocarboxylic acids; and (3) an alpha,beta-monoethylenically unsaturated carboxylic acid having from one to two—COOH moieties per molecule in a proportion sufficient to provide said acidic polymer with a carboxylic acid number in the range of 10 to 150; and B. an organic solvent-soluble epoxy functional copolymer of a plurality of polymerizable alpha,beta-monoethylenically unsaturated monomers;

the improvement comprising, (1) said acidic copolymer (A), wherein 1000 g thereof contain 0.5 to 3 moles of alpha,beta-monoethylenically unsaturated carboxylic acid and 0.6 to 2 moles of alpha,beta-monoethylenically unsaturated carboxylic acid monomer units esterified with a structure selected from the group consisting of:

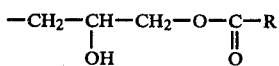

or

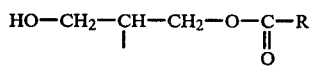

wherein R is a saturated or unsaturated aliphatic hydrocarbon radical having 1 to 26 carbon atoms, or a branched chain of the formula:

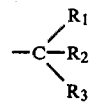

where $R_1$, $R_2$, and $R_3$ are an H atom or saturated or unsaturated aliphatic hydrocarbon radicals having a straight chain of 1 to 12 carbon atoms; and (2) said epoxy functional polymer (B) is a copolymer of at least one member selected from the group consisting of alpha,beta-monoethylenically unsaturated hydrocarbons, alkanol esters of alpha,beta-monoethylenically unsaturated monocarboxylic acids, and glycidyl esters of alpha,beta-monoethylenically unsaturated monocarboxylic acids, in sufficient proportion to provide said epoxy copolymer with an epoxy equivalent weight of from 120 to 2000; and (3) the relative proportions of said acidic copolymer (A) and said epoxy copolymer (B) are 0.5 to 1.5 carboxylic groups of the copolymer (A) per epoxy group of the copolymer (B); and (4) said heat-curable mixture is in solution in a volatile liquid comprising an organic solvent therefor.

5. The method of claim 4, wherein 0.5 to 1.5 carboxyl groups of copolymer A are provided per epoxide group of copolymer B.

6. The method of claim 4, wherein 0.9 to 1.1 carboxyl groups of copolymer A are provided per epoxide groups of copolymer B.

* * * * *